Dec. 24, 1968  W. J. HAMPSHIRE  3,418,197
FIBER REENFORCED BONDING TAPE
Filed March 17, 1965

INVENTOR.
WILLIAM J. HAMPSHIRE
BY
ATTORNEY

United States Patent Office 3,418,197
Patented Dec. 24, 1968

3,418,197
FIBER REENFORCED BONDING TAPE
William J. Hampshire, Cuyahoga Falls, Ohio, assignor to Goodyear Aerospace Corporation, Akron, Ohio, a corporation of Delaware
Filed Mar. 17, 1965, Ser. No. 440,580
4 Claims. (Cl. 161—58)

ABSTRACT OF THE DISCLOSURE

An adhesive tape material utilizing oriented short lengths of reenforcing fibers to provide great strength to the tape material wherein the fibers are oriented into streams with the streams being interwoven in a criss-crossed relationship. The fibers are overlapped within the formed streams and are able to slide relative to each other within the stream as well as with fibers in adjacent streams during molding thereof. Further, the fibers tend to flow or be associated with the surrounding resin during the flowing which thereby allows the tape material to flow without losing its strength characteristics.

---

This invention relates to a fiber reenforced bonding tape, and more particularly to an adhesive tape material which utilizes oriented reenforcing fibers to provide great strength to the tape, while also providing moldable characteristics in the tape.

Heretofore, it has been known that there have been many and various types of bonding tape utilizing many and various types of adhesives. However, the problem of bonding or adhesively securing two parts or components together which do not have uniform or exact bonding surfaces is difficult, particularly where these variations are large and require considerable amounts of adhesive. Generally, adhesive utilized for bonding irregular or misfit joints does not have great shear strength, or if it does have good shear strength, it does not have the necessary moldability to conform readily to the irregular joint. In other words, an adhesive bonding material, which utilizes a fabric base or other type lamination to achieve considerable shear strength, is not readily flowable or moldable to conform to an irregular joint between two parts to be adhesively secured together.

Therefore, it is the general object of the present invention avoid and overcome the foregoing and other difficulties of and objects to prior art practices by the provisions of an adhesive material that will adjust to a wide range of misfit or irregularities between parts to be joined while maintaining equal or greater strength than current bonded joint means.

A further object of the invention is to provide a low cost adhesive material with equal or greater shear strength than those previously known, but which is also readily moldable while maintaining its shear strength to conform to irregular joint surfaces.

Another object of the invention is to provide an adhesive material which, when used in association with the application of adhesives during a bonded assembly, will substantially reduce the cost of adhesively joining parts.

A further object of the invention is to provide a material that is capable of acting both as an adhesive and edge or panel reenforcement or be formed as a structural layer between bonded parts by flowing and adjusting its thickness and shape when clamped or pressed into contact.

A further object of the invention is to provide a low cost adhesive material which is made essentially from a base resin which resin can be so controlled as to provide adhesion characteristics to substantially any building material.

The aforesaid objects of the invention and other objects which will become apparent as the description proceeds are achieved in a fiber reenforced adhesive material which includes a base resin, a curing agent intermixed with the resin to control the cure thereof, a plurality of elongated glass fibers orientated in a laminarly interlaced criss-cross pattern with the intermixed resin and curing agent so that a majority of the fibers intersect at about 90° and overlap each other, a plurality of short asbestos fibers randomly intermixed in the base resin to enhance the adhesive characteristics of the resin, and a flow control agent intermixed in the base resin to control the viscosity of the resin.

For a better understanding of the invention, reference should be had to the accompanying drawings, wherein.

Figure 1:
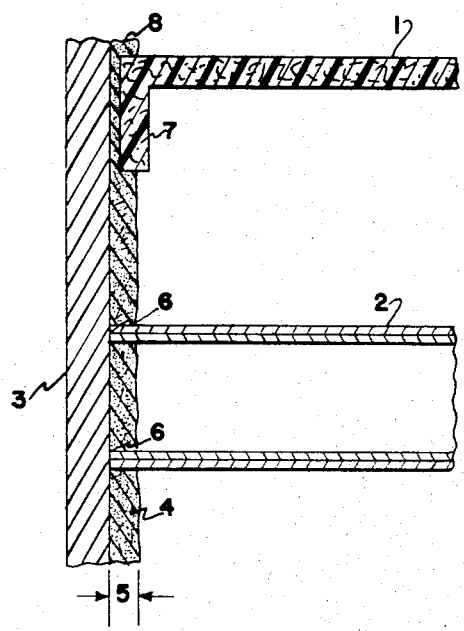
FIGURE 1 is a broken away, cross sectional view of several different structural materials bonded together utilizing the adhesive material of the invention.

In FIGURE 1 the numeral 1 represents a structural edge beam of fiber reenforced plastic, steel or aluminum, the numeral 2 indicates a structural core material such as honeycomb made from aluminum, fiber reenforced plastic or paper, and 3 represents a structural face sheet or skin made of fiber reenforced plastic, aluminum or other suitable material. An adhesive bonding material, indicated generally by the numeral 4, adhesively secures the beams 1 and 2 in fixed relationship to each other and to the face sheet 3. The exact properties of the adhesive material 4 will be more fully described below, but it should be noted that the normal way to apply the adhesive in this situation would be to first position a slab or layer of the adhesive material 4 of a thickness indicated by the numeral 5 onto the face sheet material 3. Then an end 6 of the honeycomb core material member 2 is forced into, and substantially completely through, the adhesive material 4 until it contacts the skin or facing material 3, as indicated. This forcing through does not destroy the fabric-like qualities of the adhesive material, as more fully described below, but the material 4 yields thereto and flows around the end 6 to provide a complete and full bond between the end 6 of the structural member 2 and the skin or facing material 3. Obviously, substantially the same degree of adhesive bonding may be achieved if the end 6 is not forced completely through the adhesive material 4 so that it contacts the skin or facing material 3. The structural beam 1 has an extending flange portion 7 which is pressed into the adhesive material 4 to thereby cause a flowing of the material 4 as it is compressed up and around the top of the beam 1, as indicated at 8. Again, this flowability caused by pressing the flange 7 against the adhesive material 4, will not destroy the fabric-like shear strength qualities of the adhesive material 4, again as will be more fully described below. The flowable qualities of the material 4 to conform to the shape of any associated materials with any type of interrelated fit is shown by the forced fit of the end 6 of the structural beam 2 and the pressed fit of the flange 7 of the structural beam 1 thereto. Naturally, the material 4 is extremely effective for bonding along a long joint between two parts which do not quite mesh.

Figure 2:
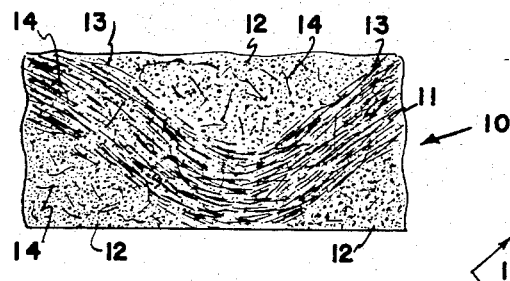
FIGURE 2 is an enlarged, cross sectional view of the adhesive bonding material of the invention taken on line 2—2 of FIGURE 3.

With reference to FIGURE 2, the numeral 10 indicates generally a fiber reenforced adhesive bonding material which comprises a plurality of ribbon or strip-like mixtures of resin and elongated glass fibers which are laid down in a fabric fashion, but which overlap with adjacent ribbons or strips. Normally, the laying of the mixture of fibers and resin will be onto a releasable carrying web or tape (not shown) of any desired width. The laying may be accomplished by any suitable means such as, for example, an appropriate spray nozzle, or nozzles, laying a continuous diamond shaped or criss-crossed pattern, so arranged, if desired, to provide an interwoven effect upon the laying. The tape or web may be moved relative to the nozzles to facilitate the laying of the fiber and resin mixture. The fibers are normally multiple end fiberous glass roving, with suitable finish, elongated strands, being of about 1 to 6 inches in lenth, but preferably being of about 2 inches in length. However, a suitable glass yarn or other strand or thread-like material would also meet the requirements of the invention. Thus, in FIGURE 2, what could be called a warp yarn 11 is interwoven over and under a plurality of what could be called weft yarns 12. Naturally, it is to be understood that each of the warp yarns 11 and weft yarns 12 comprises a ribbon or strip or resin having the glass fibers intermixed and substantially orientated therewith. The intermixture of the glass fibers in longitudinally oriented relationship with the ribbons or streams of resin gives the material a fabric-like consistency. The longitudinally running warp yarn 11 clearly illustrates the alignment of a plurality of elongated glass fibers 13 therein, which provide the fabric-like consistency. Only the ends of the fibers are seen in the weft yarns 12 because of the cross sectional end on view of one of multiple layers.

In order to enhance the adhesive characteristics and the strength of the material 10, a plurality of short asbestos fibers 14 may be randomly intermixed with each of the warp and weft yarns 11 and 12. Also, in order to control the viscosity or flow of the material 10, a flow control agent, such as silica aerogel powder could be added in suitable quantity as desired.

Figure 3:
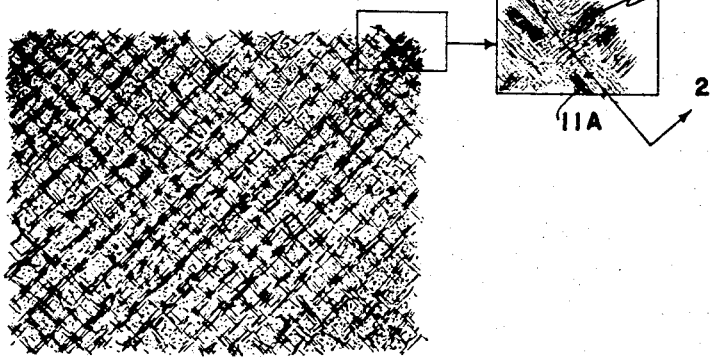
FIGURE 3 is an enlarged, broken away, plan view of the adhesive bonding material of FIGURE 2.

FIGURE 3 shows a plan view of the material of FIGURE 2 and illustrates a criss-cross pattern made by a plurality of warp yarns 11 and 11A and weft yarns 12 and 12A, which actually are ribbons or strips of resin having the glass fibers substantially aligned longitudinally therein. The heavier criss-cross lines in the material, as shown in FIGURE 3, merely represent the overlapping of each of the parallel adjacent spaced ribbons or strips of resin with elongated glass fibers aligned therewith. Of course, if desired, the strips representing the warp yarns 11 and 11A and weft yarns 12 and 12A could be laid in spaced relation without overlapping. In this instance, excess resin would fill the gaps between strips. It should be understood that the criss-cross pattern, shown in FIGURE 3, will naturally allow pantographing under pressure to permit the adhesive material to adjust to thicknesses or produce a flowing effect, as necessary, to achieve a complete filling between an irregular joint. Also, because of the non-connected relationship of the glass fibers associated with each ribbon or stream of resin material, there can be extension or flowing of the warp and weft yarns 11, 11A and 12, 12A without materially effecting the criss-crossed, interwoven fabric-like consistency of the material.

Normally, the invention contemplates that plastic resins, such as polyesters and epoxides, will be utilized for the resin base with this being further adjusted by utilizing various mixtures or proportions of polyesters or epoxides, which may be rigid or somewhat flexible when cured, to give a desired resiliency in the adhesive material when set up, thereby minimizing the stresses which normally build up at the edges of adhesive bonded joints utilizing adhesives which become rigid when set up. Also, the selection of the resin utilized for the adhesive material may be such as to furnish good adhering characteristics to the particular materials which it will be used to join. Thus, this adhesive material may adhere to stainless steel, iron, aluminum, paper, cloth, etc.

It should be understood that a catalyst will normally be added to the adhesive material as it is formed to thereby determine the cure properties. Naturally, the catalyst could require heat and pressure to effect the cure, although this is not necessary. The pressure of pressing the two parts to be joined together into the adhesive material will perhaps be all the pressure that is required to effect the cure. It should be understood that the adhesive is normally applied in its liquid or semiliquid non-cured condition with the parts then being pressed into position relative thereto and held in their desired position until the adhesive properly sets up. Although the adhesive material will normally be formed in rather thin strip-like forms, for example, between about .025 to about .100 inch, a laminate of the material 10 in FIGURE 2 may be built up to almost any desired thickness in order to effect a bonding material of greater thickness than the thickness in which the material 10 is initially formed. In this laminated material, it is also found that the flow characteristics of the material will be excellent, since in effect, each laminated layer will slide relative to the other while still allowing the pantographing of each separate layer or the extension of the warp or weft yarns therein.

The cure, or set-up of the resin may be effective in any siutable manner after the adhesive tape material has been positioned in engagement with a member or members.

Thus, it is seen that the orientation of the resin with the orientated elongated glass fibers therein intersecting and overlapping at about 90° to effect a crisis-cross pattern allows the fibers to move in a controlled directional manner when pressed between two parts to be joined. This effectively fills the space between the joint with structurally reenforced materials which allow a wide range of mismatch of the surfaces and further acts as a structural transitional material between the parts. Naturally, the fabric-like consistency of the adhesive material provides a great shear and tensile strength thereby making the bonded joint between two mismatched surfaces probably at least as strong as the materials themselves. Further, the material may be used not only as an adhesive, but as an edge or panel reenforcement, or it may be performed as a structural layer while bonding interfitting parts by flowing and adjusting thicknesses when the parts are clamped or pressed into contact. It is believed that this material will substantially reduce the labor and handling problems associated with the application of adhesives during the bonding assembly because of its simplicity, and its flowing characteristics thereby making it adaptable to any type of bonding situation. The flowability of the material to adjust to irregular, or misfit surfaces, provides the adhesive material with a great degree of flexibility in its use.

What is claimed is:
1. In a fiber reenforced bonding tape material for bonding misfit or irregular joints between parts or members, the combination of:
  a base adhesive resin,
  a curing agent intermixed with the resin to control the cure thereof,
  a plurality of substantially straight elongated glass fibers at least one inch in length oriented within the intermixed resin and curing agent by separate fibers overlapping and extending generally in the same direction to each other within formed strands with the strands arranged to provide an interwoven effect wherein the individual fibers have the tendency to remain associated with the resin immediately adjacent thereto, and with the majority of the strands intersecting at about 90° and overlapping to form a criss-cross pattern, a plurality of short asbestos fibers randomly intermixed in the base resin to enhance the adhesive qualities thereof, and a flow control agent intermixed with the base resin.

2. A material according to claim 1 where a thermosetting epoxy resin is used as the base resin and where the glass fibers are between about 1 to 6 inches in length.

3. A material according to claim 1 where a polyester resin is used as the base resin and where a curing agent is added therto for selectively controlling the cure time of the material under conditions ranging from temperature and pressure to room temperature under contact pressure.

4. A material according to claim 1 where a plurality of layers of the material are positioned in a laminated form to provide a material of greater thickness where each layer is slidable relative to the other during any molding of the material to a desired shape, and where each respective layer also allows pantographing and relative movement of the criss-cross pattern of elongated fibers therein.

References Cited

UNITED STATES PATENTS

| | | | |
|---|---|---|---|
| 2,632,752 | 3/1953 | Anderson | 161 |
| 2,861,910 | 11/1958 | Johnston et al. | 161—195 |
| 2,951,004 | 8/1960 | Martin et al. | 161—68 XR |
| 2,952,579 | 9/1960 | Merriman | 161—93 XR |
| 2,975,503 | 3/1961 | Bacon et al. | 161—95 XR |
| 3,018,208 | 1/1962 | Werner et al. | 161—55 XR |
| 3,073,004 | 1/1963 | Zeise | 161—95 XR |

FOREIGN PATENTS 932,842   7/1963   Great Britain.

JACOB H. STEINBERG, *Primary Examiner.*

WILLIAM A. POWELL, *Assistant Examiner.*

U.S. Cl. X.R.

161—59, 68, 156, 170, 140; 156—313, 330